(12) United States Patent
Webster

(10) Patent No.: US 9,184,649 B2
(45) Date of Patent: Nov. 10, 2015

(54) ELECTRICAL MACHINE WITH CONTRA-ROTATING ROTORS

(75) Inventor: John R. Webster, Derby (GB)

(73) Assignee: ROLLS-ROYCE PLC, London (GB)

( * ) Notice: Subject to any disclaimer, the term of this patent is extended or adjusted under 35 U.S.C. 154(b) by 346 days.

(21) Appl. No.: 13/525,660

(22) Filed: Jun. 18, 2012

(65) Prior Publication Data

US 2012/0326539 A1    Dec. 27, 2012

(30) Foreign Application Priority Data

Jun. 23, 2011  (GB) .................................. 1110640.8

(51) Int. Cl.
*H02K 19/20*   (2006.01)
*H02K 51/00*   (2006.01)
*H02K 7/116*   (2006.01)
*H02K 7/18*    (2006.01)
*H02K 16/00*   (2006.01)

(52) U.S. Cl.
CPC ................ *H02K 51/00* (2013.01); *H02K 7/116* (2013.01); *H02K 7/1823* (2013.01); *H02K 16/00* (2013.01); *Y02E 10/725* (2013.01)

(58) Field of Classification Search
CPC ...... H02K 16/02; H02K 16/00; H02K 16/005
USPC .................... 310/46, 112–114, 166, 168, 169
See application file for complete search history.

(56) References Cited

U.S. PATENT DOCUMENTS

| | | | | |
|---|---|---|---|---|
| 3,603,823 A | * | 9/1971 | Mason | 310/46 |
| 3,646,375 A | * | 2/1972 | Mader | 310/83 |
| 3,944,865 A | * | 3/1976 | Jewitt | 310/178 |
| 3,956,678 A | * | 5/1976 | Byrne et al. | 318/400.3 |
| 4,441,043 A | * | 4/1984 | DeCesare | 310/46 |
| 4,763,031 A | * | 8/1988 | Wang | 310/83 |
| 4,782,929 A | * | 11/1988 | Muller | 192/53.35 |
| 7,199,484 B2 | * | 4/2007 | Brashears | 290/54 |
| 7,679,249 B2 | * | 3/2010 | Appa et al. | 310/114 |
| 8,063,528 B2 | * | 11/2011 | Toot | 310/114 |
| 2009/0243416 A1 | * | 10/2009 | Ito | 310/156.47 |
| 2009/0289516 A1 | * | 11/2009 | Hopewell et al. | 310/115 |

FOREIGN PATENT DOCUMENTS

| | | | | |
|---|---|---|---|---|
| GB | 191514643 A | | 10/1915 | |
| GB | 2062977 A | * | 5/1981 | ............ H02K 21/04 |
| JP | A-2009-202439 | | 9/2009 | |
| WO | WO 2004/040740 A1 | | 5/2004 | |

OTHER PUBLICATIONS

Sep. 29, 2011 British Search Report issued in British Patent Application No. GB1110640.8.

* cited by examiner

*Primary Examiner* — Naishadh Desai
(74) *Attorney, Agent, or Firm* — Oliff PLC

(57) ABSTRACT

An electrical machine comprising: a first stator member (16) having a field magnet (22); a second stator member (18) forming an armature, the second stator member (18) being spaced from the first stator member (16); and a pair of contra-rotatable rotors (12a, 12b) disposed between the first and second stator members (16, 18); wherein at least a portion (14) of each of the rotors (12a, 12b) is magnetisable so as to transmit magnetic flux between the field magnet (22) and the armature.

15 Claims, 7 Drawing Sheets

ELECTRICAL MACHINE WITH CONTRA-ROTATING ROTORS

The present invention relates to an electrical machine with contra-rotating rotors, and particularly, but not exclusively, to an electrical generator for use with a wind or water turbine.

A wind or water turbine typically comprises a rotor having a plurality of blades of aerofoil cross-section. The reaction of the blades to the passing wind or water creates a component of force which causes rotation of the rotor. The turbine is connected to an electrical generator which converts the rotation of the rotor into useful power.

The ability of such a turbine to create useful power is limited by the tip speed of the blades of the turbine. Faster tip speeds are realised with smaller diameter turbines. However, larger diameter turbines interrupt a larger area of air or water flow and thus provide a higher power output. Consequently, it is necessary to compromise between large diameter and slow rotation or small diameter and fast rotation when designing a turbine.

The electrical generator size is determined to a first approximation by the torque; meaning that a high speed, low torque machine is generally attractive. These opposing characteristics lead to the requirement for a gearbox between the two components. These gearboxes are recognised within the industry as expensive and require high maintenance.

Direct drive, single rotor concepts have been studied as a means of removing the gearbox, but these are less commercially attractive and generally require a much larger generator or smaller turbine.

Direct drive of wind or water turbines offers the potential to remove the high capital and maintenance cost and reduced reliability of a gear box.

Within the generator, a high pole passing frequency (and hence flux cutting rate) is desirable for more efficient generation. Higher pole passing at a given speed may be achieved by increasing the number of poles, but this would lead to increased diameter (and hence cost and weight) or smaller poles and less flux per pole.

It is also known to employ a turbine with contra-rotating rotors. With such a turbine one rotor may carry field coils and the other may form the armature in which an electromotive force (e.m.f.) is induced. The contra-rotation of the rotors effectively doubles the relative speed of the turbine and thus increases the power output. However, such a contra-rotating turbine poses additional problems related to establishing an electrical connection with a rotating member (i.e. slip rings, brushes, etc.). Consequently, this increases the cost and complexity of the turbine.

It is desirable to provide an electrical machine which overcomes some or all of the above identified problems.

In accordance with an aspect of the invention there is provided an electrical machine comprising: a first stator member having a field magnet; a second stator member forming an armature, the second stator member being spaced from the first stator member; and a pair of contra-rotatable rotors disposed between the first and second stator members; wherein at least a portion of each of the rotors is magnetisable so as to transmit magnetic flux between the field magnet and the armature.

At least one of the rotors may, in use, be driven by a prime mover and the rotors may transmit magnetic flux from the field magnet to the armature thereby inducing an electromotive force. The prime mover may be any device which causes the rotation of the rotors.

The electrical machine of the present invention may have a pole passing frequency which is four times greater than that of a conventional electrical machine of similar size and geometry. Alternatively, the same pole passing frequency may be achieved by the electrical machine of the present invention at a lower speed than a conventional turbine.

Each rotor may comprise a plurality of pole pieces which are magnetisable. By magnetisable, it will be understood that the pole pieces will be a high permeability material. For example, the permeability of the pole pieces may range from between 500 to 2000. Preferably, the pole pieces will be ferromagnetic.

The pole pieces may be passive and therefore the present invention may not require rotating magnets, windings or slip rings etc.

The outer rotor and inner rotor may have different numbers of pole pieces.

The field magnet may be an electromagnet or a permanent magnet.

The first stator member may comprise a plurality of field magnets spaced around the first stator member.

The second stator member may comprise a conductor or conductive coil which forms the armature.

As the field magnet and armature are located on the non-rotating stator members, the present invention may make the use of electromagnetic windings much more simple by alleviating the need for brushes, slip rings etc. Furthermore, as the rotors may be simple metallic components, construction may be simpler and the components may be more robust so that clearances and hence magnetic air gaps may be reduced to increase efficiency.

The first and second stator members and the rotors may be arranged concentrically.

The first and second stator members and the rotors may each comprise a plurality of poles.

The poles may extend in an axial direction.

One or more of the poles may be helical.

The rotors, first stator member and/or second stator member may comprise a plurality of sets of poles.

For example, the sets of poles may be spaced along the electrical machine in an axial direction. The poles of one set may be staggered from the poles of the or each other set in a circumferential direction.

These arrangements may provide even torque throughout the rotation of the rotors.

The rotors may be coupled by a gearbox which causes the rotors to rotate in opposite directions.

The gearbox may provide synchronous rotation of the rotors.

The gearbox may be an epicyclic gearbox.

The epicyclic gearbox may comprise: a fixed gear; a first sun gear connected to one of the rotors and driven by relative movement between the fixed gear and said one of the rotors; and a second sun gear connected to said one of the rotors and driven by the first sun gear, the second sun gear driving the other of the rotors.

The fixed gear may be an outer or inner gear.

The gearbox may comprise a fixed idler gear located between the rotors.

The fixed idler gear may be a compound gear to compensate for the difference in diameter between the rotors.

The gearbox may be a magnetic gearbox comprising a plurality of magnets spaced around each rotor and a plurality of fixed pole pieces disposed between the rotors.

The gearbox may comprise an overload clutch to allow non-synchronous movement of the rotors.

The overload clutch may be a magnetic clutch.

The magnetic clutch may comprise an intermediate rotor which may be magnetically coupled to one of the rotors when the torque between said one of the rotors and the intermediate rotor is below a threshold value and which may permit relative rotation between said one of the rotors and the intermediate rotor when the torque exceeds the threshold value.

The intermediate rotor may comprise a first plurality of magnets spaced around the intermediate rotor and said one of the rotors may comprise a second plurality of magnets spaced around the rotor. The first and second pluralities of magnets may be arranged to: attract one another so that the rotors are in a stable position when the first plurality of magnets are aligned with the second plurality of magnets; or repel one another so that the rotors are in a stable position when each of the first plurality of magnets are disposed between an adjacent pair of second magnets.

This arrangement may allow the rotors to undergo non-synchronous movement whilst the torque is above the threshold value and to lock into an adjacent stable position when the torque is again below the threshold value.

The first and second pluralities of magnets may be spaced so that the rotors are in phase in the stable position.

Therefore, the clutch may allow the rotors to slip whilst ensuring that they remain in phase.

The electrical machine may be a motor or a generator.

The generator may be connected to a wind or water turbine which may drive one or both rotors.

The turbine may be a vertical or horizontal axis turbine.

In accordance with another aspect of the invention there is provided an electrical machine comprising: a first stator member having a field magnet; a second stator member forming an armature, the second stator member being spaced from the first stator member; and a rotor; wherein the first and second stators and the rotor are concentrically arranged with the rotor disposed between the first and second stators; wherein at least a portion of the rotor is magnetisable so as to transmit magnetic flux between the field magnet and the armature.

For a better understanding of the present invention, and to show more clearly how it may be carried into effect, reference will now be made, by way of example, to the accompanying drawings, in which.

Figure 1:
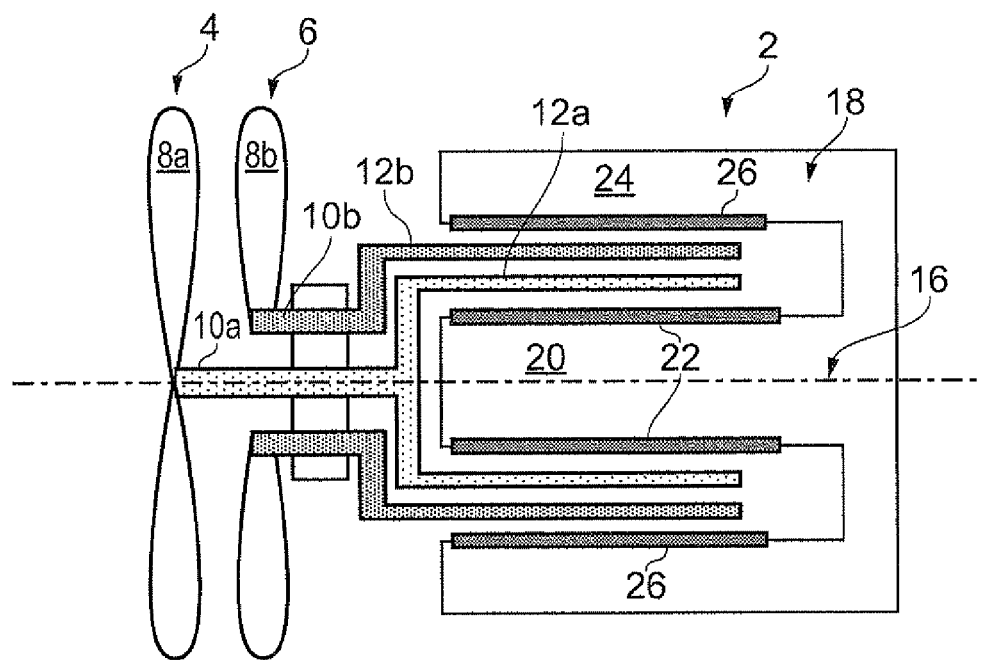
FIG. 1 is a schematic cross-sectional side view of a turbine having a generator in accordance with an embodiment of the invention.
Figure 2:
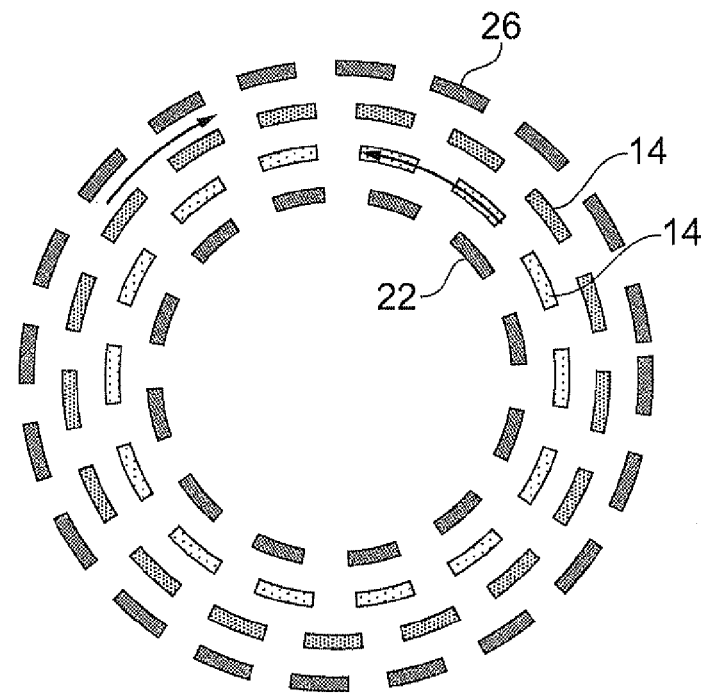
FIG. 2 is a cross-sectional view of the generator of FIG. 1 in an axial direction.

With reference to FIGS. 1 and 2, a turbine 2 comprises a first rotor stage 4 and a second rotor stage 6. The first and second rotor stages 4, 6 each comprise a plurality of blades 8a, 8b spaced around the circumference of a shaft 10a, 10b.

The blades 8a, 8b may have an aerofoil shaped cross-section and, in reaction to the passing wind or water, create a component of force which causes rotation of the rotor stage 4, 6. The first and second rotor stages 4, 6 rotate about a common axis with the blades 8a of the first rotor stage 4 preceding the blades 8b of the second rotor stage 6 in the direction of the oncoming wind or water. The shaft 10b of the second rotor stage 6 has an aperture formed therethrough for receiving the shaft 10a of the first rotor stage 4, thus allowing rotation about a common axis. Bearings may be provided between the shaft 10a of the first rotor stage 4 and the shaft 10b of the second rotor stage 6.

The blades 8a, 8b of the first and second rotor stages 4, 6 are configured so that the first rotor stage 4 rotates in the opposite direction to the second rotor stage 6, as indicated by the arrows in FIG. 2. This may be achieved by selecting the appropriate pitch for the blades 8a, 8b of the first and second rotor stages 4, 6.

The first and second rotor stages 4, 6 further comprise first and second rotor drums 12a, 12b respectively. The first and second rotor drums 12a, 12b are connected to and rotated by the blades 8a, 8b via the shafts 10a, 10b. As shown in FIG. 2, each of the first and second rotor drums 12a, 12b are formed from a plurality of elongate pole pieces 14 which are spaced around the circumference of the rotor drum 12a, 12b and extend in an axial direction. The pole pieces 14 are passive and are formed from ferromagnetic materials such that they are magnetisable. Adjacent poles pieces 14 are spaced apart from one another.

The first rotor drum 12a of the first rotor stage 4 has a smaller diameter than the second rotor drum 12b of the second rotor stage 6. Accordingly, the first and second rotor drums 12a, 12b are concentric with the first rotor drum 12a located within the second rotor drum 12b.

A fixed stator assembly is provided which comprises a first stator member 16 and a second stator member 18. The first stator member 16 is formed on a central post 20, around the circumference of which are spaced a plurality of field poles 22. Adjacent field poles 22 are spaced apart from one another. The field poles 22 may be permanent magnets or electromagnets. The field poles 22 are arranged so that adjacent field poles 22 have opposite polarities. Therefore, the polarities of the field poles 22 alternate as you move around the circumference of the central post 20. The field poles 22 extend in an axial direction along the length of the central post 20.

The second stator member 18 encircles the first stator member 16 and is spaced away from the first stator member 16. The second stator member 18 is formed on an outer ring 24 and comprises a plurality of power poles 26 spaced around the circumference of an inwardly facing radial surface of the outer ring 24. Adjacent power poles 26 are spaced apart from one another. The power poles 26 are conductors or conductive coils which form an armature. The power poles 26 extend in an axial direction.

The field poles 22 of the first stator member 16 and the power poles 26 of the second stator member 18 are arranged in anti-phase, with the field poles 22 offset from the power poles 26. Therefore, in a radial direction each field pole 22 is located opposite to a gap between an adjacent pair of power poles 26, and vice versa. This can be seen more clearly in FIG. 3.

The space between the first and second stator members 16, 18 is sized to receive the rotor drums 12a, 12b of the first and second rotor stages 4, 6. Accordingly, the first stator member 16 is adjacent to the first rotor drum 12a and the second stator member 18 is adjacent to the second rotor drum 12b. In this arrangement, the pole pieces 14 of the first and second rotor drums 12a, 12b are at least partially aligned in a radial direction with the field poles 22 and the power poles 26 of the first and second stator members 16, 18 respectively.

The first stator member 16 may have the same number of field poles 22 as there are power poles 26 on the second stator member 18. Furthermore, the first and second rotor drums 12a, 12b may have the same number of pole pieces 14 and/or the same number of poles pieces as there are field poles 22 or power poles 26.

The first and second rotor drums 12a, 12b and the first and second stator members 16, 18 form a generator for producing useful power from the action of the wind or water. The components of the generator are arranged concentrically with the first stator member 16 forming the innermost element, followed by the first rotor drum 12a, second the rotor drum 12b, and finally the second stator member 18 as the outermost element.

Figure 3:
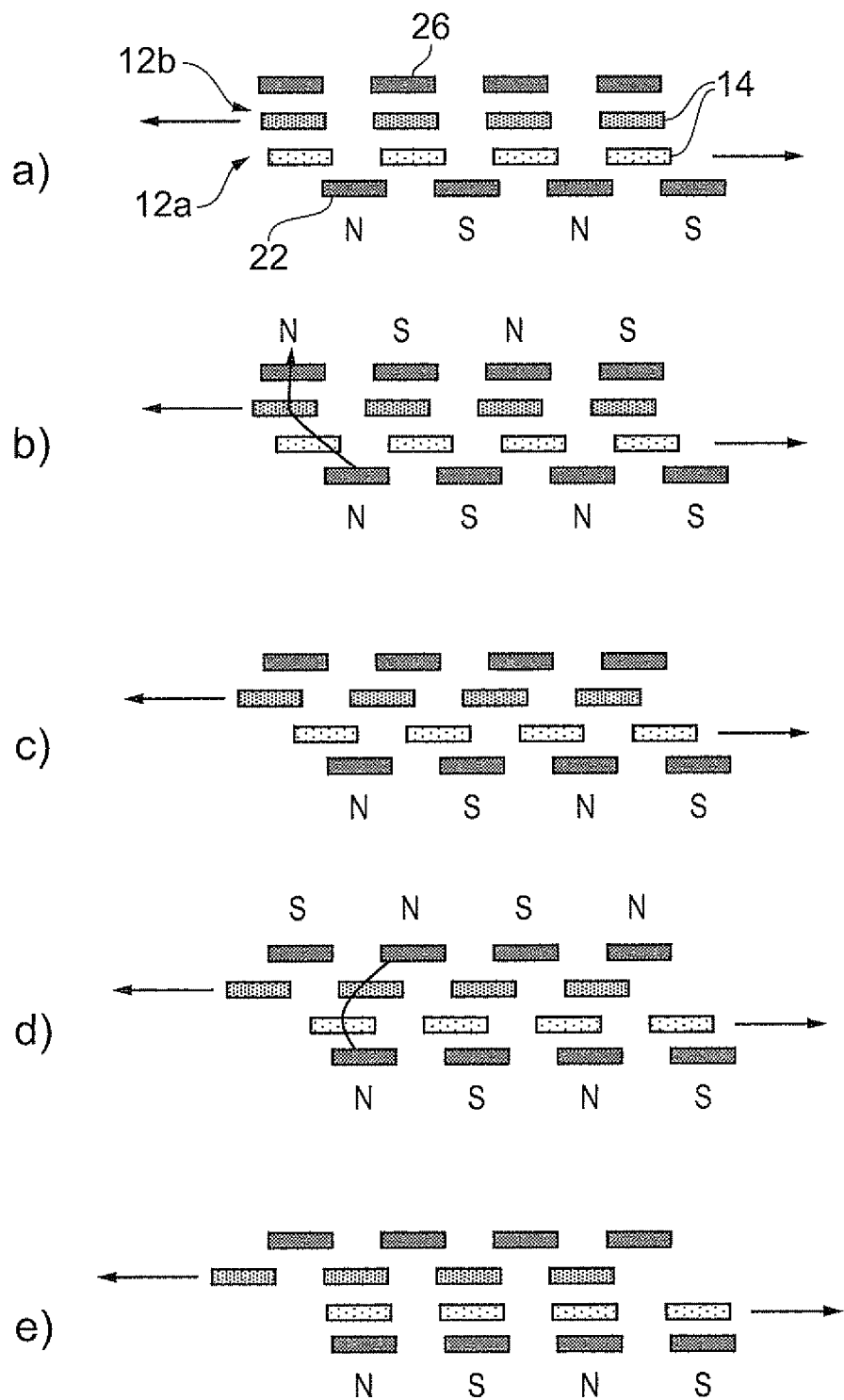
FIG. 3 is a representative view showing the operation of the generator.

The operation of the generator will now be described with reference to FIG. 3. FIG. 3 is a representative view which depicts the circular first and second stator members 16, 18 and the first and second rotor drums 12a, 12b as having been opened out to form linear strips, Having said that, FIG. 3 may also be considered to show a linear electrical machine in accordance with another embodiment of the invention. In such an embodiment the "rotors" undergo reciprocating movement in anti-phase.

As previously described, the first and second rotor stages 4, 6 are configured to contra-rotate. FIG. 3 shows the movement of the pole pieces 14 of the first and second rotor stages 4, 6 in a series of positions (a) to (e). At position (a) the pole pieces 14 of the first and second rotor stages 4, 6 are in phase and aligned with the power poles 26 of the second stator member 18. In each subsequent position the phase of the pole pieces 14 of the first and second rotor stages 4, 6 are advanced by Pi/8, until at position (e) the pole pieces 14 of both the first and second rotor stages 4, 6 are aligned with the field poles 22 of the first stator member 16.

The field poles 22 of the first stator member produce a magnetic field. As described previously, this may be by way of a permanent magnet or an electromagnet. The pole pieces 14 of the first and second rotor stages 4, 6 act as flux linkage poles which can transmit the magnetic flux from the field poles 22 to the power poles 26 of the second stator member 18 when the pole pieces 14 are appropriately arranged.

In position (a), the pole pieces 14 of the first rotor drum 12a are located between adjacent field poles 22. Consequently, flux is not transmitted between the field poles 22 and the pole pieces 14 of the first rotor stage 4 and therefore flux does not arrive at the power poles 26 of the second stator member 18.

In position (b), where there is a Pi/8 phase miss-match, there is a complete overlapping path (as indicated by the arrow) from the field poles 22 of the first stator member 16 to the power poles 26 of the second stator member 18. In other words, the pole pieces 14 of the first rotor stage 4 and the pole pieces of the first rotor drum 12a overlap. Similarly, the pole pieces 14 of the first and second rotor drums 12a, 12b overlap and the pole pieces 14 of the second rotor drum 12b overlap with the power poles 26 of the second stator member 18. The flux linkage between the field poles 22 and the power poles 26 therefore creates a magnetic field in the coils of the power poles 26 and induces an e.m.f. in the power poles 26.

In position (c), where there is a 2P1/8 phase miss-match, although the pole pieces 14 of the first rotor drum 12a overlap with the field poles 22, the pole pieces 14 of the first and second rotor drums 12a, 12b do not overlap and therefore do not allow the transmission of flux to the power poles 26.

In position (d), where there is a 3Pi/8 phase miss-match, there is again a complete overlapping path (as indicated by the arrow) from the field poles 22 of the first stator member 16 to the power poles 26 of the second stator member 18. Accordingly, a magnetic field is created in the coils of the power poles 26 and an e.m.f. is induced in the power poles 26. However, in contrast to position (b), the polarity of the power poles 26 is reversed in position (d).

In position (e), where there is a 4Pi/8 phase miss-match, although the pole pieces 14 of the first rotor drum 12a overlap with the field poles 22, and the pole pieces 14 of the first and second rotor drums 12a, 12b overlap with one another, the pole pieces 14 of the second rotor drum 12b do not overlap with the power poles 26 of the second stator member 18. Accordingly, there is no path formed to allow the transmission of flux to the power poles 26.

It can be seen that through these five positions the flux linkage between the first and second stator members 16, 18 has gone through the sequence 0, N (for example), 0, S, 0. Accordingly, a complete magnetic cycle has been completed after moving each of the first and second rotor stages 4, 6 by a quarter of a pole phase (Pi/2). A conventional single rotor generator undergoes such a cycle each pole phase, i.e. 2Pi. Therefore, the generator of the turbine 2 of the present invention has a pole passing frequency which is four times greater than that of a conventional single rotor turbine.

Alternatively, the same pole passing frequency may be achieved by the turbine 2 of the present invention at a quarter of the speed of a conventional turbine. Therefore, the turbine 2 may be made to be four times the diameter i.e. 16 times the area and potentially produce 16 times the power of a conventional turbine. The solution alters the compromise between tip speed, rotor diameter, rotor speed and generator diameter to give an alternative optimum commercial solution. The first and second rotor drums 12a, 12b have simple passive pole pieces 14 only, and therefore do not require rotating magnets, windings or slip rings etc. Furthermore, as the field poles 22 and power poles 26 are fixed, the use of electromagnetic windings becomes much more simple and alleviates the need for brushes, slip rings etc. As the rotors are simple metallic components, construction should be simpler and the components more robust so that clearances and hence magnetic air gaps can be reduced to increase efficiency.

Although the present invention allows the generator to be driven directly, it may still be necessary to provide a gearbox arrangement between the first and second rotor stages 4, 6 to synchronise the contra-rotation of the first and second rotor stages 4, 6.

Figure 4:
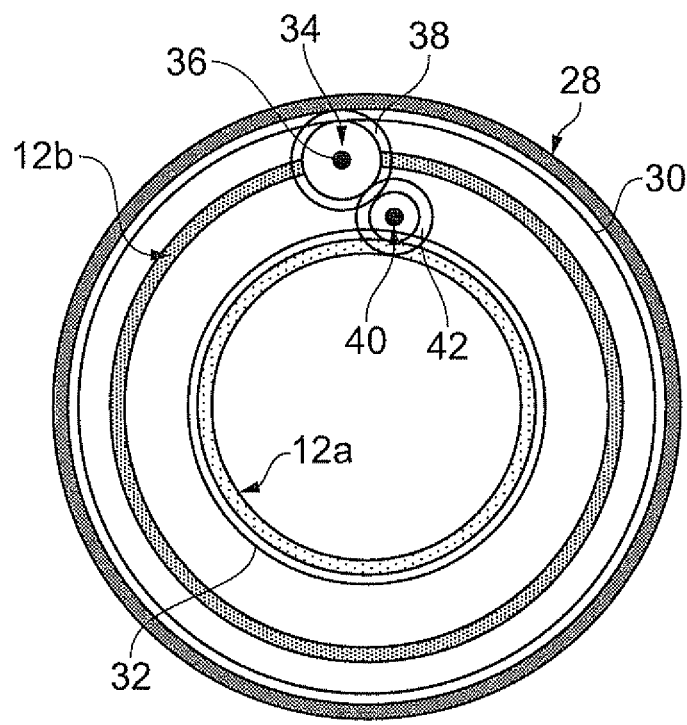
FIG. 4 is a cross-sectional view in an axial direction of another embodiment of a generator having a gearbox.

Such a gearbox arrangement is shown in FIG. 4. The embodiment of a gearbox arrangement shown in FIG. 4 is an epicyclic gearbox and comprises a fixed outer gear 28 which encircles at least a portion of the first and second rotor drums 12a, 12b. The fixed outer gear 28 remains stationary relative to the first and second rotor drums 12a, 12b. The fixed outer gear 28 may be located towards the blade-end of the rotor drums i.e. outside of the first and second stator members 16, 18.

The fixed outer gear 28 comprises teeth 30 on an inwardly facing surface of the gear 28. Similarly, the first rotor drum 12a comprises teeth 32 on an outwardly facing surface of the first rotor drum 12a. A first sun gear 34 is rotatably connected to the second rotor drum 12b at a pivot 36. The first sun gear 34 has teeth 38 which mesh with the teeth 30 of the fixed outer gear 28. A second sun gear 40 is rotatably connected to the second rotor drum 12b either directly or via the first sun gear 34. The second sun gear 40 comprises teeth 42 which mesh with the teeth 38 of the first sun gear 34 and the teeth 32 of the first rotor drum 12a.

Rotation of the second rotor drum 12b causes the first sun gear 34 to rotate in the opposite direction through the interaction of the first sun gear 34 with the fixed outer gear 28. The second sun gear 40 is driven in the opposite direction by the first sun gear 34 which in turn drives the first rotor drum 12a.

Conversely, rotation of the first rotor drum 12a rotates the second sun gear 40 in the opposite direction. The second sun gear 40 drives the first sun gear 34 in the opposite direction and the first sun gear 34 in turn causes the rotation of the second rotor drum 12b through the interaction with the fixed outer gear 28. Accordingly, the first and second rotor drums 12a, 12b are made to rotate synchronously in opposite directions.

Although the fixed outer gear 28 has been described as encircling the first and second rotor drums 12a, 12b, it could alternatively have a smaller diameter than the first rotor drum 12a and be located within the first and second rotor drums 12a, 12b. With this arrangement, the first and second sun gears 34 and 40 would be connected to the first rotor drum 12a. Locating the fixed gear within the first rotor drum 12a may allow the gearbox to be made smaller and thus lighter.

Furthermore, although only one pair of first and second sun gears 34, 40 are shown, a plurality of such gears may be spaced around the circumference of the first and second rotor drums 12a, 12b.

Figure 5:
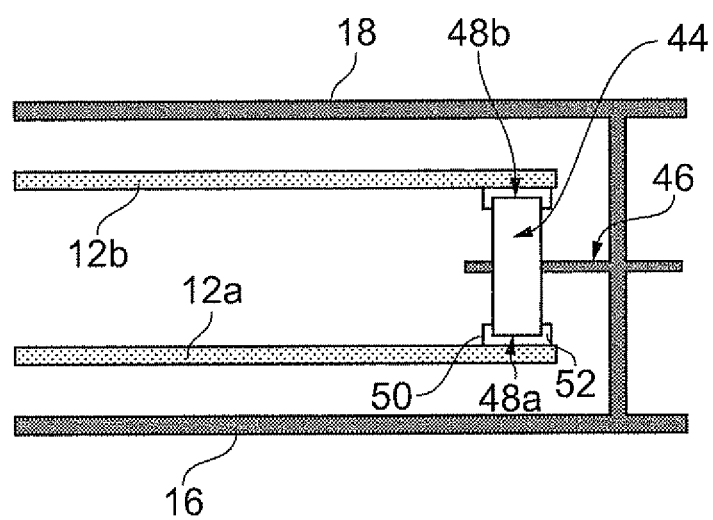
FIG. 5 is a cross-sectional side view of another embodiment of a generator having an alternative gearbox.

FIG. 5 shows an alternative embodiment of a gearbox arrangement which may be used to synchronise the contra-rotation of the first and second rotor stages 4, 6. With this embodiment, the gearbox arrangement is located at the free end (i.e. spaced from the blades) of the first and second rotor drums 12a, 12b. The first and second rotor drums 12a, 12b may be extended so that the gearbox arrangement can be located away from the field poles 22 and power poles 26 of the first and second stator members 16, 18.

With the arrangement of FIG. 5, a fixed idler gear 44 is disposed between the first and second rotor drums 12a, 12b. The idler gear 44 is rotatably connected to a bracket 46. The idler gear 44 has an axis of rotation which is parallel to the axis of rotation of the first and second rotor drums 12a, 12b.

The outwardly facing surface of the first rotor drum 12a and the inwardly facing surface of the second rotor drum 12b are provided with teeth 48a, 48b which mesh with the idler gear 44. Although a single idler gear 44 is shown, it may be necessary to use a compound idler gear to provide synchronous rotation of the first and second rotor drums 12a, 12b (see FIG. 10) where the difference in diameter between the first and second rotor drums 12a, 12b precludes the use of a single idler gear.

The teeth 48a, 48b each comprise a pair of radial shoulders 50, 52 which axially retain the idler gear 44. The rotation of the first rotor drum 12a causes the idler gear 44 to rotate in the same direction, which in turn drives the second rotor drum 12b in the opposite direction, or vice versa.

Although only one idler gear 44 is shown, a plurality of idler gears may be spaced around the circumference of the first and second rotor drums 12a, 12b. Furthermore, although the shoulders 50, 52 retain the idler gear 44 axially, the idler gear 44 may be allowed to translate axially along the bracket 46 to allow the first and second rotor drums 12a, 12b to move in an axial direction. Alternatively, the radial shoulders 50, 52 of the teeth 48a, 48b may be omitted to allow axial movement.

Although a gearbox arrangement may be required to synchronise rotation of the first and second rotor stages 4, 6, it is only necessary for the gearbox to control the difference in torque between the first and second rotor stages 4, 6. In contrast, conventional designs must provide a gearbox which can withstand the total torque.

The gearbox arrangement may experience high transient loads during use. Conventionally, the gearbox would be designed to withstand the maximum load likely to be experienced. However, such an approach leads to a gearbox which is oversized for the vast majority of the operation and hence wasteful in terms of manufacturing cost and weight etc. To overcome this problem an overload clutch may be provided to allow non-synchronous movement of the first and second rotor stages 4, 6 under high load conditions.

Figure 6:
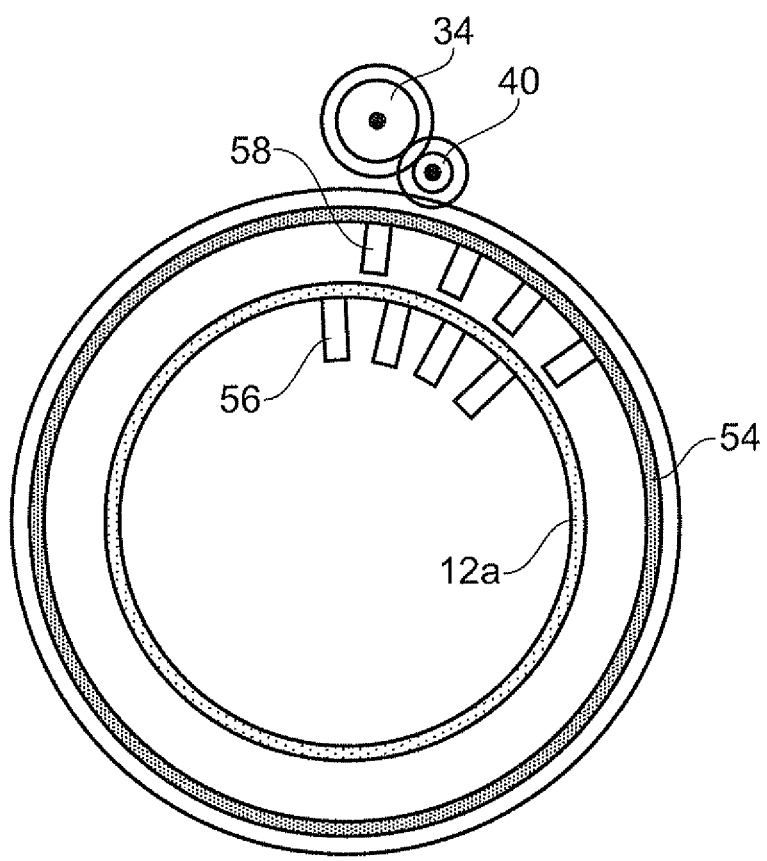
FIG. 6 is a cross-sectional view in an axial direction of another embodiment of a generator having an overload clutch.

An embodiment of an overload clutch is shown in FIG. 6. The overload clutch of FIG. 6 is a modification of the epicyclic gearbox arrangement described above with reference to FIG. 4 and comprises a fixed outer gear (28, not shown in FIG. 6) and first and second sun gears 34, 40.

The overload clutch comprises an intermediate rotor drum 54 disposed between the first and second rotor drums 12a, 12b. In contrast to the gearbox arrangement of FIG. 4, it is the intermediate rotor drum 54 which comprises the teeth 32 on an outwardly facing surface, rather than the first rotor drum 12a. The teeth 42 of the second sun gear 40 mesh with the teeth 32 of the intermediate rotor drum 54.

The first rotor drum 12a comprises a plurality of magnets 56 spaced around the circumference of the first rotor drum 12a. Similarly, the intermediate rotor drum 54 comprises a plurality of magnets 58 spaced around the circumference of the intermediate rotor drum 54. The number and/or spacing of the magnets 56, 58 on the first rotor drum 12a and the intermediate rotor drum 54 may be equal.

The magnets 56, 58 of the first rotor drum 12a and the intermediate rotor drum 54 have their magnetic axis (i.e. an axis passing from the North pole of the magnet to the South pole of the magnet) aligned in a radial direction.

The magnets 56, 58 of the first rotor drum 12a and the intermediate rotor drum 54 are arranged so that they have like-poles at their adjacent ends i.e. the North poles of the magnets 56 of the first rotor drum 12a face outwards and the North poles of the magnets 58 of the intermediate rotor drum 54 face inwards. Consequently, the magnets 56 of the first rotor drum 12a repel the magnets 58 of the intermediate rotor drum 54. As a result, the first rotor drum 12a and the intermediate rotor drum 54 align in the most stable position, this being where the magnets 56 of the first rotor drum 12a are disposed midway between an adjacent pair of magnets 58 of the intermediate rotor drum 54.

The arrangement of the magnets 56, 58 provides magnetic coupling between the first rotor drum 12a and the intermediate rotor drum 54. Therefore, rotation of the first rotor drum 12a may cause rotation of the intermediate rotor drum 54, and vice versa. In other words, relative rotation of the first rotor drum 12a and the intermediate rotor drum 54 is prevented. As for FIG. 4, rotation of the second rotor drum 12b causes the first sun gear 34 to rotate in the opposite direction through the interaction of the first sun gear 34 with the fixed outer gear 28. The second sun gear 40 is driven in the opposite direction by the first sun gear 34 which in turn drives the intermediate rotor drum 54. Therefore, the second rotor drum 12b drives the first rotor drum 12a, and vice versa, via the intermediate rotor drum 54.

However, when the torque between the first rotor drum 12a and the intermediate rotor drum 54 is sufficiently large, it may overcome the repulsive forces thereby allowing non-synchronous movement of the first rotor drum 12a and the intermediate rotor drum 54 and hence of the first rotor drum 12a and the second rotor drum 12b. Whilst the torque exceeds this threshold value, the first rotor drum 12a and the intermediate rotor drum 54 are allowed to rotate relative to one another. However, when the torque falls below the threshold value, the magnets 56, 58 assume the closest stable position with the magnets 56 of the first rotor drum 12a interleaved with the magnets 58 of the intermediate rotor drum 54.

Alternatively, the magnets 56, 58 of the first rotor drum 12a and the intermediate rotor drum 54 may be arranged so that they have opposite-poles at their adjacent ends i.e. the North poles of the magnets 56 of the first rotor drum 12a face outwards and the South poles of the magnets 58 of the intermediate rotor drum 54 face inwards, or vice versa. Consequently, the magnets 56 of the first rotor drum 12a attract the magnets 58 of the intermediate rotor drum 54. As a result, the first rotor drum 12a and the intermediate rotor drum 54 align in the most stable position, this being where the magnets 56 of the first rotor drum 12a are aligned with magnets 58 of the intermediate rotor drum 54.

In this configuration, the torque between the first rotor drum 12a and the intermediate rotor drum 54 must overcome the attractive forces between the magnets 56, 58 in order to allow relative rotation between the first rotor drum 12a and the intermediate rotor drum 54. When the torque falls below the threshold value, the magnets 56, 58 assume the closest stable position with the magnets 56 of the first rotor drum 12a aligned with the magnets 58 of the intermediate rotor drum 54.

The magnets 56, 58 of the first rotor drum 12a and the intermediate rotor drum 54 are arranged so that in the stable position the first and second rotor drums 12a, 12b are in phase, i.e. the pole pieces 14 of the first and second rotor drums 12a, 12b are aligned or interleaved. Therefore, should relative rotation between the first rotor drum 12a and intermediate rotor drum 54 occur, the next stable position will replicate the previous stable position prior to such relative rotation.

Again, the fixed outer gear 28 may have a smaller diameter than the first rotor drum 12a and be located within the first and second rotor drums 12a, 12b. With this arrangement, the first and second sun gears 34 and 40 would be connected to the first rotor drum 12a. The magnets 56 are therefore located on the second rotor drum 12b and provide magnetic coupling between the intermediate rotor drum 54 and the second rotor drum 56. Further still, the intermediate rotor drum 54 could be magnetically coupled to the fixed outer (or inner) gear 28, thus retaining the fixed gear 28 in place whilst the torque is below the threshold value but allowing the fixed gear 28 to rotate when the torque exceeds the threshold value, thereby preventing the fixed gear 28 from rotating the first or second rotor drum 12a, 12b.

Figure 7:
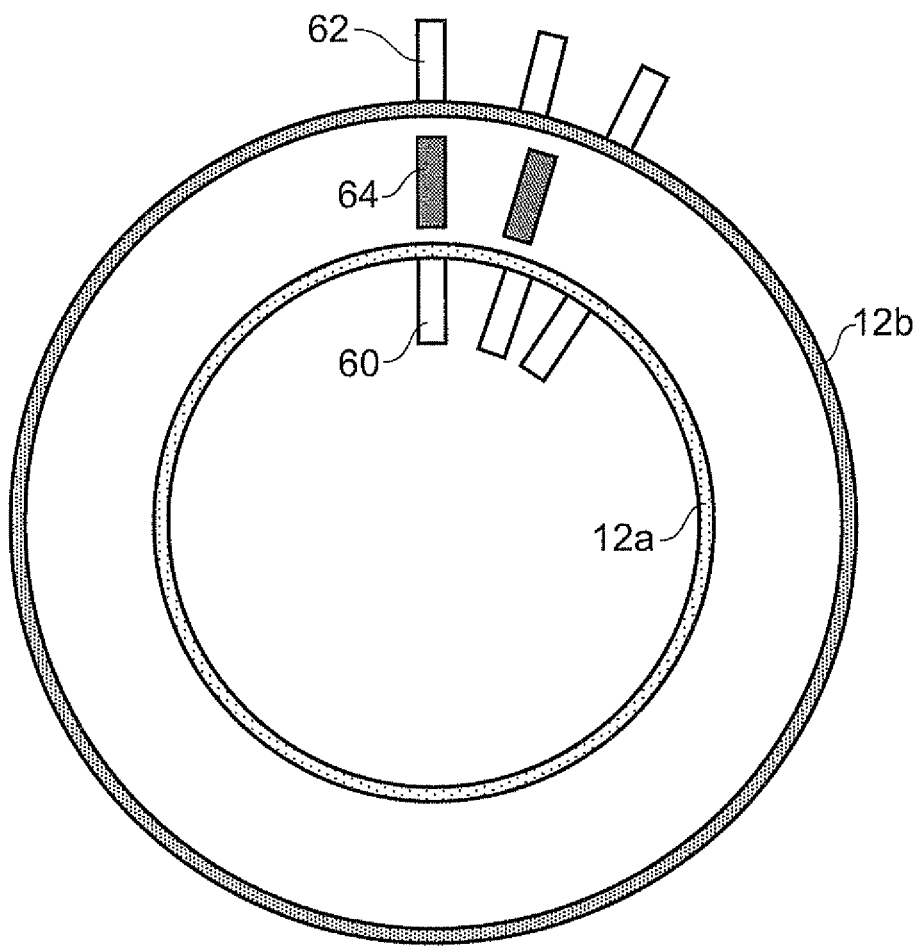
FIG. 7 is a cross-sectional view in an axial direction of another embodiment of a generator having an alternative gearbox.

Alternatively, a magnetic gearbox may be used as shown in FIG. 7 which provides synchronisation of the first and second rotor drums 12a, 12b and allows non-synchronised movement of the first and second rotor drums 12a, 12b when the torque between the first and second rotor drums 12a, 12b exceeds a threshold value.

The magnetic gearbox arrangement comprises a plurality of magnets 60 spaced around the circumference of the first rotor drum 12a and a plurality of magnets 62 spaced around the circumference of the second rotor drum 12b. The magnets 60, 62 of the first and second rotor drums 12a, 12b are arranged so that the magnets 60, 62 have alternating polarity around the circumference of the first and second rotor drums 12a, 12b (i.e. magnet 60 with inward facing North pole adjacent to a pair of magnets 60 with inward facing South poles). A plurality of ferromagnetic pole pieces 64 are disposed between the first and second rotor drums 12a, 12b with their longitudinal axes oriented radially. The pole pieces 64 transmit flux between the magnets 60, 62 to control the rotation of the first and second rotor drums 12a, 12b. Through selection of the number of magnets 60, 62 and pole pieces 64, the first and second rotor drums 12a, 12b may be controlled to contra-rotate synchronously. Similarly, to the magnetic overload clutch described above with reference to FIG. 6, the magnetic gearbox also allows non-synchronous rotation when the torque exceeds a threshold value and resumes synchronous movement in phase.

Construction of the field poles 22 and power poles 26 is much simplified because they do not need to rotate and therefore do not require the same level of mechanical strength against centrifugal or vibrational loads. The first and second rotor drums 12a, 12b are relatively simple generally cylindrical elements with passive pole pieces 14 which transfer flux. As described previously, the pole pieces 14 may be axially aligned and therefore transfer flux between the outer surfaces of the pole pieces 14 of the first rotor drum 12a and the inner surfaces of the pole pieces of the second rotor drum 12b. However, the pole pieces 14 may instead extend in a radial direction with the pole pieces 14 of the first rotor drum 12a extending outwardly and the pole pieces 14 of the second rotor drum 12b extending inwardly. Here, flux is transferred between the opposing axial surfaces of the pole pieces 14.

It is desirable to use pole pieces 14 which are laminated to reduce eddy current losses. The laminations extend in a radial-axial plane i.e. the direction in which flux travels. Consequently, the pole pieces 14 have a low tolerance to circumferential stresses.

Figure 8:
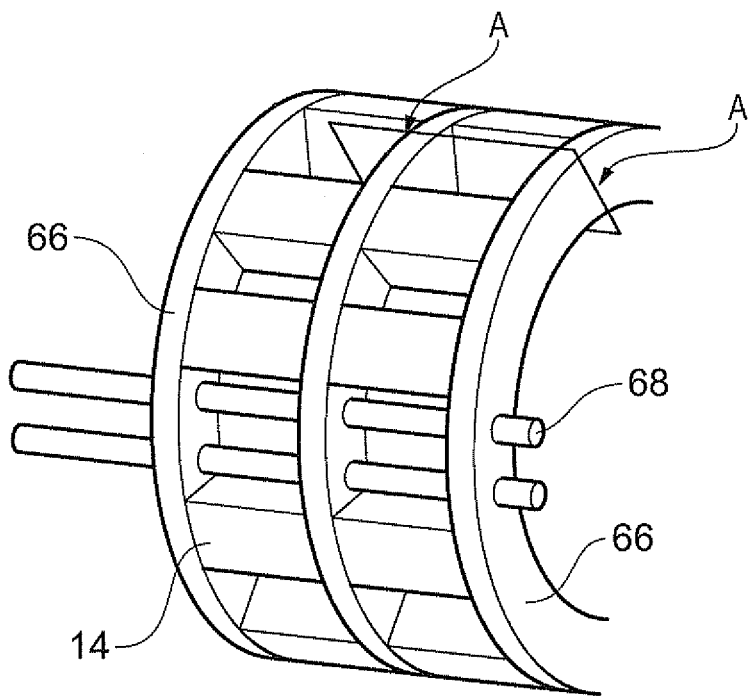
FIG. 8 is a perspective view of a rotor of the generator.

FIG. 8 shows an embodiment of the physical construction of the first or second rotor drum 12a, 12b intended to improve its circumferential strength. As shown, the rotor drum comprises a plurality of hoops 66 which are spaced from one another in an axial direction. The hoops 66 are connected by a plurality of bars 68 which extend in an axial direction and pass through each of the hoops 66 at locations spaced around the circumference of the hoops 66. The spacing of the hoops 66 along the bars 68 may be fixed using conventional techniques, such as bolts, welding, etc.

The pole pieces 14 are disposed between adjacent hoops 66. The pole pieces 14 are connected to the hoops 66 and/or bars 68 using an inference fit, for example. The hoops thereby provide circumferential strength to the pole pieces 14.

Figure 9:
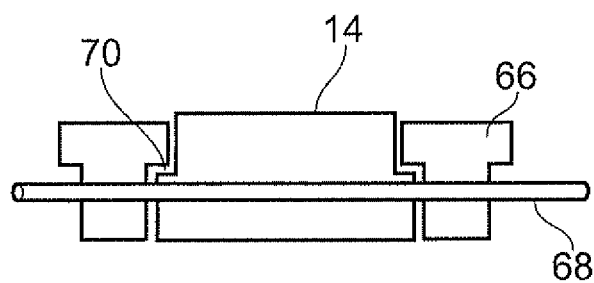
FIG. 9 is a cross-section through the rotor of FIG. 8 along the plane A-A.

FIG. 9 shows a cross-section through the plane A-A of FIG. 8. As shown, the hoops 66 may be provided with axial shoulders 70 and the pole pieces 14 may be provided with corresponding axial recesses which abut with the axial shoulders 70 when the pole pieces 14 are located between the hoops 66. The shoulders 70 of the hoops 66 act to retain the pole pieces 14 when under centrifugal loading.

Figure 10:
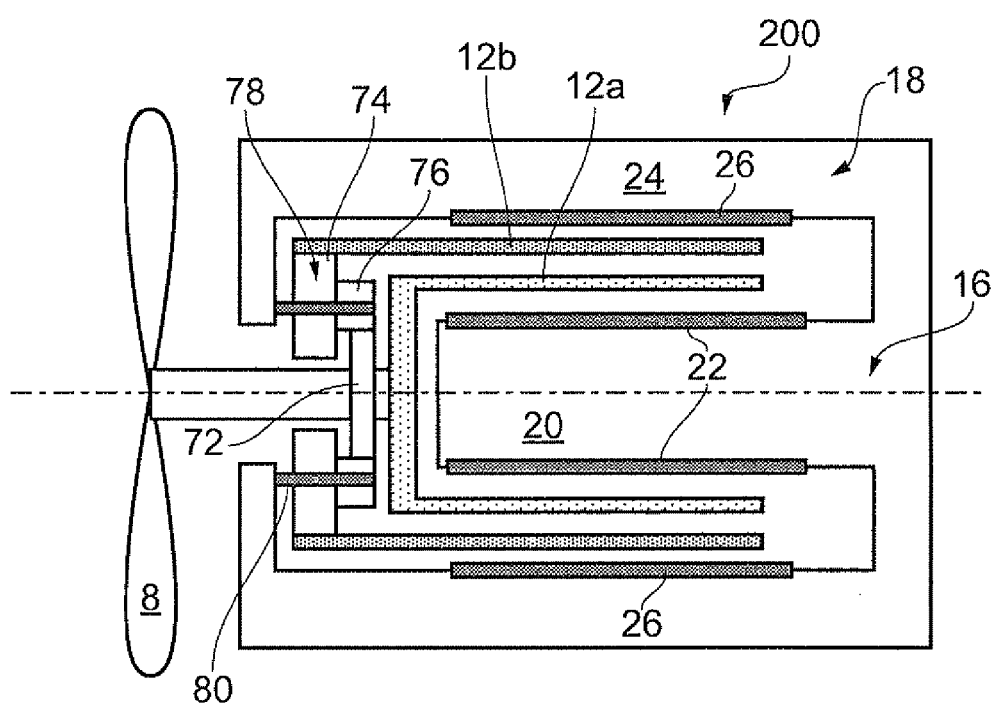
FIG. 10 is a cross-sectional side view of a turbine having a generator in accordance with another embodiment of the invention.

An alternative embodiment of the turbine is shown in FIG. 10. The turbine 200 of this embodiment has blades 8 only on the first rotor stage 4. In reaction to the passing wind or water, the blades 8 create a component of force which causes rotation of the first rotor stage 4. In contrast to the embodiment of FIG. 1, the second rotor stage 6 is not driven directly by the wind or water and therefore does not have any blades. The second rotor stage comprises only the second rotor drum 12b which is driven by the rotation of the first rotor stage 4. The second rotor drum 12b is made to rotate in the opposite direction to the first rotor drum 12a using a gearbox arrangement.

The gearbox arrangement may be as described previously with respect to FIGS. 4 to 7. Alternatively, as shown in FIG. 10 the shaft 10a may comprise a gear 72 located between the blades 8 and the first rotor drum 12a. The gear 72 drives the second rotor drum 12b via a fixed compound idler 74. The fixed compound idler 74 comprises a smaller gear 76 and a larger gear 78. The fixed compound idler 74 is rotatably connected to the casing of the generator by a bracket 80. The fixed compound idler 74 therefore has an axis of rotation which is parallel to the axis of rotation of the first and second rotor drums 12a, 12b. The smaller gear 76 is driven by the gear 72 and the larger gear 78 drives the second rotor drum 12b. The fixed compound gear 74 therefore provides contra-rotation of the first and second rotor drums 12a, 12b and compensates for the difference in diameter (and hence number of teeth) between the gear 72 and the second rotor drum 12b.

This arrangement would provide the same pole passing multiplication and stationary windings etc. Furthermore, the gearbox would only need to carry half the power and so may be lower cost and more light weight.

it will be understood that the rotors may have different numbers of poles provided that the pole passing frequency and phase are maintained. The gearing shown in FIG. 5 will result in the pole pieces of the outer rotor 12b moving at the same linear speed as pole pieces of rotor 12a, but with the outer rotor having a slower rotational speed. Hence, in one embodiment the outer rotor 12b may include more pole pieces than the inner rotor provided the gearing is appropriately selected to maintain the pole passing frequency required by the electromagnetic relationship of the components required for generation and as described above.

Alternatively, the second rotor drum 12b may be driven directly by the wind or water and the first rotor drum 12a driven indirectly via the second rotor drum 12a, In order to prevent uneven torque as the pole pieces 14 of the first and second rotor drums 12a, 12b pass over the field poles 22 of the first stator member 16 and the power poles 26 of the second stator member 18, one or more helical poles may be provided in the first rotor drum 12a, second rotor drum 12b, first stator member 16 and/or second stator member 18. Alternatively, the first and second rotor drums 12a, 12b and the first and second stator members 16, 18 may be provided with several sets of poles. The sets of poles are spaced along the generator in an axial direction to effectively define a plurality of generators. The poles of one generator are staggered from the poles of the or each other generator in a circumferential direction. This arrangement provides even torque throughout the rotation of the first and second rotor drums 12a, 12b. The plurality of sets of poles may also be used to provide a polyphase system i.e. 3-phase.

Although the invention has been described as having first and second rotor stages 4, 6 and first and second rotor drums 12a, 12b, it could have more than two rotor stages and/or rotor drums. Each additional rotor drum will increase the pole passing frequency by two times the number of rotor drums.

The invention is not limited to a horizontal axis turbine as shown, but could instead be used with a vertical axis turbine. Furthermore, the generator of the present invention is not restricted to wind or water turbines, but could be used in other situations where contra-rotating power is available.

Although the present invention has been described with reference to a generator, it could be utilised in other electrical machines. For example, the invention could be used as a motor. This may be particularly useful for providing power to contra-rotating props on an electrically powered aircraft or boat.

The invention claimed is:

1. An electrical machine comprising:
a first stator member having a field magnet;
a second stator member forming an armature, the second stator member being spaced from the first stator member; and
a pair of contra-rotatable rotors disposed between the first and second stator members,
wherein at least a portion of each of the rotors is magnetisable,
wherein each rotor comprises a plurality of pole pieces which are magnetisable,
wherein at least one of the rotors is, in use, driven by a prime mover and the rotors transmit magnetic flux from the field magnet to the armature thereby inducing an electromotive force, wherein a magnetic field produced by the plurality of pole pieces extends between the first stator member and the second stator member, such that the plurality of pole pieces of the first and second stator members act as flux linkage poles that transmit the magnetic flux from the field magnet of the first stator to the armature of the second stator member, and
wherein the first and second stator members and the rotors are arranged concentrically.

2. An electrical machine as claimed in claim 1, wherein the field magnet is an electromagnet or a permanent magnet.

3. An electrical machine as claimed in claim 1, wherein the first stator member comprises a plurality of field magnets spaced around the first stator member.

4. An electrical machine as claimed in claim 1, wherein the second stator member comprises a conductor or conductive coil which forms the armature.

5. An electrical machine as claimed in claim 1, wherein the first and second stator members and the rotors each comprise a plurality of poles.

6. An electrical machine as claimed in claim 5, wherein the poles extend in an axial direction.

7. An electrical machine as claimed in claim 5, wherein one or more of the poles are helical.

8. An electrical machine as claimed in claim 1, wherein at least one of the rotors, the first stator member and the second stator member comprises a plurality of sets of poles.

9. An electrical machine as claimed in claim 1, wherein the rotors are coupled by a gearbox which causes the rotors to rotate in opposite directions.

10. An electrical machine as claimed in claim 9, wherein the gearbox provides synchronous rotation of the rotors.

11. An electrical machine as claimed in claim 9, wherein the gearbox is an epicyclic gearbox.

12. An electrical machine as claimed in claim 10, wherein the gearbox comprises a fixed idler gear located between the rotors.

13. An electrical machine as claimed in claim 9, wherein the gearbox comprises an overload clutch to allow non-synchronous movement of the rotors.

14. An electrical machine as claimed in claim 1, wherein the plurality of pole pieces comprise a material having a magnetic permeability in a range between 500 to 2000.

15. An electrical machine as claimed in claim 1, wherein the plurality of pole pieces are ferromagnetic.

* * * * *